INFORMATION STORAGE AND TRANSFER SYSTEM
FOR DIGITAL COMPUTERS

Filed July 15, 1964

INVENTOR
Hermann Hummel

BY Spencer & Kaye
ATTORNEYS 3,351,909

INFORMATION STORAGE AND TRANSFER SYSTEM FOR DIGITAL COMPUTERS

Hermann Hummel, Meersburg, Germany, assignor to Telefunken Patentverwertungsgesellschaft m.b.H., Ulm (Danube), Germany Filed July 15, 1964, Ser. No. 382,743
Claims priority, application Germany, July 17, 1963, T 24,308
7 Claims. (Cl. 340—172.5)

ABSTRACT OF THE DISCLOSURE

An information storage and transfer system is provided for an electronic digital computer containing a high speed storage unit and a lower speed storage unit. Operand words upon which operations are to be performed are stored both in the high speed storage unit and in the lower speed storage unit. Instruction words are stored in the lower speed storage unit, which instruction words include an operation portion signifying an operation to be performed, a high speed address portion signifying the address of an operand word stored in the high speed storage unit, and an address modification portion signifying in part the address of an operand word stored in the lower speed storage unit. The high speed storage unit contains partial address words which, when combined with the address modification portion of a corresponding instruction word, will signify the complete address of an operand word in the lower speed storage unit. In the information transfer process, the words stored in the high speed and lower speed storage units are transferred into corresponding registers in two altenating cycles, the first of the two cycles comprising an instruction transfer cycle in which an instruction word is transferred out of the lower speed storage unit and a corresponding partial address word is transferred out of the higher speed storage unit, the partial address word being combined with the address modification portion of the instruction word to form the complete address of an operand word in the lower speed storage unit. The second of the two cycles comprises an operation transfer cycle in which the operand words whose addresses were designated in the instruction transfer cycle are transferred out of the high speed and lower speed storage units to be operated on in accordance with the operation designated in the instruction transfer cycle.

Figure 1:
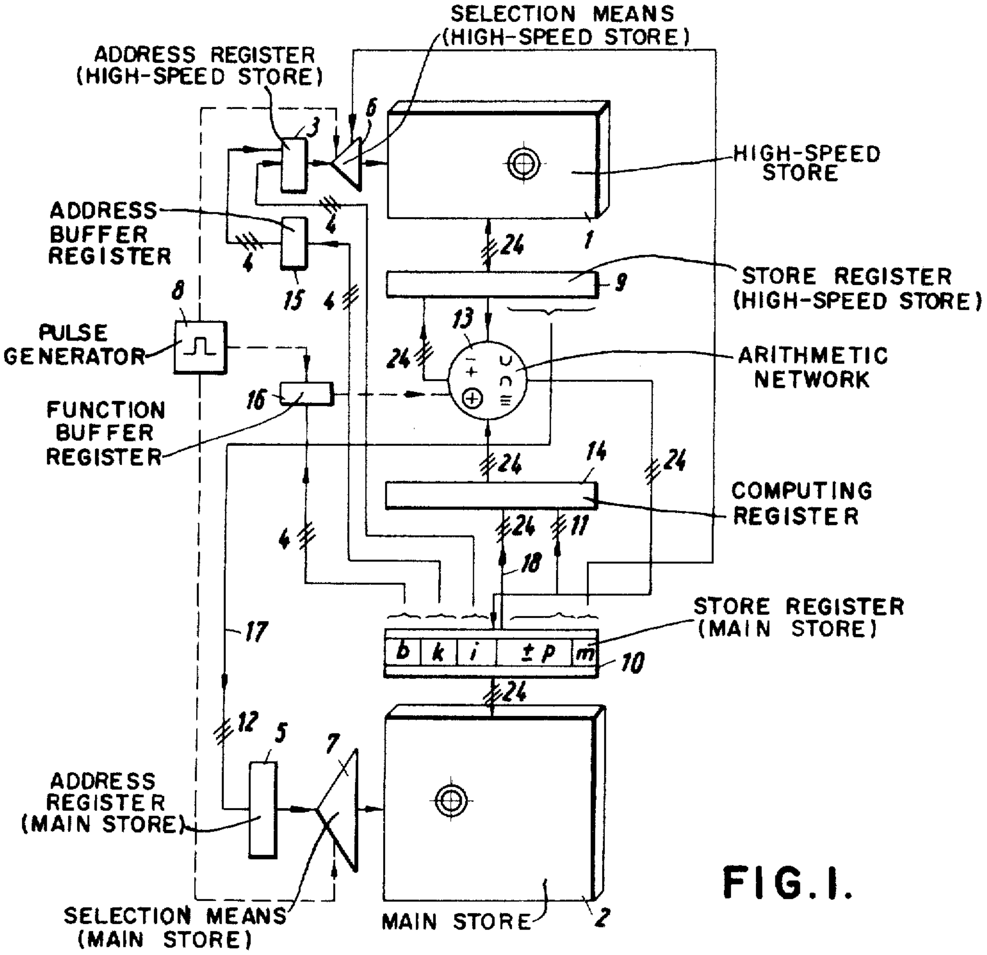

The present invention relates to a program-controlled electronic digital computer, and it is the primary object of the invention to provide an arrangement in which an arithmetic circuit coacts with both an addressable high-speed store of comparatively low storage capacity and a lower speed store which is likewise addressable but has a higher capacity, in such a manner that all the parts are utilized as fully as possible with the minimum possible expediture of registers. Such an arrangement also affords the optimum time factor for the calculations.

The main factor which determines the speed of a present day computer is the speed at which information can be written into or read from a store location. While this would suggest the use of high-speed stores, i.e., stores in which the reading and writing times are short, such high-speed stores represent a major cost factor in the whole installation, so that it is not economically feasible to equip a computer with high-speed stores exclusively.

In order to strike a compromise between speed and cost, it has been proposed to divide the entire store into a high-speed store of relatively small capacity and a slower store of greater capacity. In known installations of this type, the computing elements proper, i.e., the registers and logic circuits interconnecting the components, have a high speed as compared to that of the storage speeds, and preferably cooperate with the high-speed store, the store locations or cells of which act as buffers between the computing elements and the slower store and may coact with the slow store, for example, during intervals in the calculating.

The saving of time obtained in comparison with a computer without a high-speed store is not very great, however, because of the numerous transfer operations which are necessary between the two stores.

The transfer operations can be avoided only if the slower store, too, is directly addressable and if instructions are carried out which derive from the slower store at least one of a plurality of operands needed for a calculation. Such operation has, inter alia, the following consequences:

(1) The saving of time expected as a respect of the introduction of the high-speed store is not fully effective because the access time of the slower store has to be taken into consideration.

(2) The instructions must contain addresses of the large slower store, which addresses become very comprehensive. But the presence of comprehensive and long addresses in the instructions require extensive instruction sheets and hence much program storage space.

(3) Possibilities for modification must be provided both for the high-speed and the lower-speed store, and in each case there must be an additional bit in the instructions to identify the modification.

There already exists a computer in which the above-described disadvantages have been largely overcome by letting the information regarding the address of the slower store consist of an address in the faster store and a short address. In this case, the so-called effective address is derived, before the execution of each instruction, by adding to the short address a modification quantity which forms the contents of the designated cell in the high-speed store. As a result, it is no longer necessary to recognize and identify those instructions whose addresses still have to be modified; as a result the need for space in the instruction to indicate an address in the slow store is eliminated. Accordingly, the modification which always initiates the execution of such an instruction does not involve any loss of time because it only occupies the computing elements and the high-speed store which are in any case idle at certain times in the calculating cycle. The modification is intentionally limited to certain parts of the address so that changes of address, as a result of a modification, take place only within relatively large areas of the store at a time. The size of these areas has to be adapted to the problems at hand. In this case, the size of the entire slower store has no further influence on the building up of the instruction.

The present invention relates to a further improvement in such computers and resides, essentially, in that the information referred to above as the short address acts as a modification factor and, as such, has a plus or minus sign, and that control means dependent on instructions are provided which act in such a manner that either the result of the addition of the modification factor to the contents of the store location in the high-speed store, or these unaltered contents, are re-written into the store location in the high-speed store.

As a result, there is obtained the advantages of a particularly flexible programming of loops in that it is possible to jump forward, that is to say, in the direction of higher addresses, as well as backward, from the address in the slower store given in the store location of the high-speed store. The reference address can, accordingly, follow the movement, that is to say, it may also be altered during the modification, without the return to the starting point of the program being rendered any more difficult as a result. The associated movement of the reference address, in turn, facilitates the programming of subroutines and loops with a minimum of individual instructions.

According to the further development of the invention, a specific store location in the high-speed store always contains the address of the program store location, the contents of which are to be executed as the next instruction. The difference in speed between the two stores permits the correction of these contents to be carried out after each instruction without a separate time interval being required for this operation, so that a special instruction counter can be dispensed with. In the computer according to the invention, the same instruction including the modification can be applied to this specific store location in the high-speed store as to other store locations, which leads to a simple and clear programming of jumps.

Another advantage resides in the fact that the modification factor is conceived throughout simply as a number by which the actual address has to be altered. Accordingly, the space required for the modification factor in the instructions is not dependent on the size of the slower store. Thus, the computer according to the invention can be equipped with stores of larger or smaller storage capacity without altering composition of the instructions.

Further advantages reside in the absence of the so-called translation programs which are normally needed when reading a program into the program store in order to calculate the final addresses from the given relative ones. Finally, it should also be mentioned that any special distinguishing of the modification in the instructions is superfluous because modification is always effected.

It will be shown hereinafter that, as a result of suitable selection of the difference in speed between the two stores and as a result of sequence control of the instructions according to the invention, the store cycles of the slower store can nearly always follow one another without any gaps, so that, to a large extent, there is achieved the ideal result of utilizing all parts of the computer as far as possible simultaneously and optimally, as in the case of an analog computer in which all the computing elements that participate in a calculation contribute to the result of the calculation during the whole period of the calculation.

Additional objects and advantages of the present invention will become apparent upon consideration of the following description when taken in conjunction with the accompanying drawings in which:

FIGURE 1 is a block circuit diagram of a computer according to the present invention. The same includes a number of multiple-wire lines; by way of example, each such line has the number of wires represented by the numeral next to the three short diagonals which are symbolic of the plurality of wires.

Figure 2A:
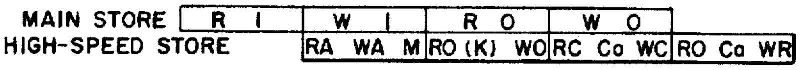
Figure 2B:
Figure 2C:

FIGURES 2*a*, 2*b* and 2*c* show several sequences of operation which occur during the execution of the instructions.

Referring now to the drawing, the same shows a high-speed store of small capacity, hereinafter termed the high-speed store, the same being constituted, for example, by a magnetic-core store 1. Its store-cycle time, that is to say, the time which passes from the application of an address, through the reading of the store location and the re-writing until the store is again ready to receive a new address is, for example, one microsecond. The store access time, that is to say, the time which passes from the application of an address until the contents of the store location which have been read are available in a store register, is, for example, one half a microsecond.

The slower store 2, hereinafter termed the main store, is, in the illustrated embodiment, assumed to have a store-cycle time of four microseconds and a store access time of two microseconds. This store, too, may be constructed in the form of a magnetic-core store, and the slower speed may be caused by the greater storage capacity and/or by the use of less expensive store cores and electronic circuits for the control of the store. The two stores are operated in parallel so that, for example 24 binary digits (bits) can be read from the store, or written into the store, simultaneously as a result of an applied address. The information unit of the 24 bits is termed a word; each store location which can be specified by an address, both in the high-speed and in the main store, can receive one word.

Each of the two stores is controlled by a respective store address register, namely, the high-speed-store address register 3 and the main-store address register 5, the former being smaller because of the smaller number of store locations, and, in particular, because it is able to receive addresses only four bits long. The main-store address register 5 can store addresses of, for example, 12 bits, so that it is possible to distinguish between 4096 store locations.

The store registers are connected to the respective stores 1 and 2 through selection means 6 and 7, respectively, in such a manner that store cycles can be executed under the control of a pulse generator 8. In the first part of each store cycle, the contents of a store location, which is defined by the contents of the address register, are transferred to one of the two store registers, i.e., the high-speed-store register 9 or the main-store register 10. In the second part of the store cycle, the contents of the store register in question are re-written into the corresponding store location. The two half-cycles are termed reading and writing, respectively. They do not necessarily have to follow one another immediately.

After the operands have been found, the instructions are carried out in the arithmetic unit which consists of registers in an arithmetic or logic network 13. In the computer according to the invention, there is, apart from the passive arithmetic network 13, only one further register 14 which is part of the arithmetic unit because, according to the invention, the two store registers are used, to a large extent, as computing registers and instruction registers. The computing register 14 likewise has a capacity of one word and is connected in parallel with the arithmetic network 13 as a supplier of operands. In the same manner, the high-speed-store register 9 is connected to the network 13 as a second supplier of operands; it also serves as result register for the results supplied from the network 13.

Apart from the elements described, the computer includes only an address buffer register 15 and a function buffer register 16. Register 15 is adapted to receive a high-speed-store address and, in certain cases, is connected to the input of the high-speed-store address register 3 for the temporary storage of an address, while the register 16, during the execution of an instruction, temporarily stores the function part of this instruction—which may comprise, for example, four bits—and monitors the execution of the instruction.

Additional control means, such as are usually present for an instruction sequence control, for the instruction control, and so on, are absent in the computer according to the invention, or rather these additional control means are embodied in time-multiplex in the registers already described. In particular, the main store register 10 may also be regarded as an instruction register because only in it are the instructions read out from the main store available for a short time. The same principle applies here as in the use of the high-speed-store register 9 as a computing register, that is to say, to avoid as far as possible those transfers within the machine which do not contribute to logical function.

An instruction for the computer of FIGURE 1 comprises a function part *b* which includes four bits and, accordingly, can distinguish between 16 different operations.

Before each actual calculation, the main store address is formed from a modification factor $\pm p$, which forms part of the instructions, and from the contents of a high-speed store $i$, the address of which is likewise a part of the instruction. Finally, the instruction also contains a further bit $m$, the significance of which will be discussed below, and an address $k$, which relates to the high-speed store. (This is a so-called two-address system.)

The operation of the computer according to the invention will now be explained with reference to FIGURES 2a, 2b and 2c which represents three diagrams.

The upper line of the diagram of FIGURE 2a indicates the course of two main store cycles, the horizontal being considered as the time coordinate. The first box on the left-hand side, designated by RI, means the interrogation of a location of the program store contained in the main store. This part is, accordingly, to be construed as "READING THE NEXT INSTRUCTION." In the following half-cycle WI ("WRITING THE INSTRUCTION"), the content read from the store location is restored again.

During this second half-cycle, a high-speed-store cycle was likewise in the process of being executed, this high-speed-store cycle being designated by RA ("READING A MAIN STORE ADDRESS FROM THE HIGH-SPEED STORE") and WA ("RE-WRITING MAIN STORE ADDRESS"). During this time, the address $i$, which is needed to form the main-store address N, has been present in the high-speed-store address register 3. After the two half cycles of the high-speed store, the modification factor $\pm p$ is transferred to the computing register 14 and additively combined with the contents of the high-speed store location $i$ (modification M). The result is temporarily stored in the high-speed-store register 9.

The main store address N is now available; it is transferred in parallel over a twelve-wire line 17 to the main-store address register 5 where the previous store cycle for collecting the instruction is followed immediately by a store cycle for collecting the operand present in the store location N. This cycle contains a half cycle RO ("READING THE OPERAND") during which the second operand, defined by the high-speed-store address $k$, is transferred from the high-speed store to the high-speed-store register 9 ("READING OF THE OPERAND") and is immediately prepared, if necessary, for the operation to follow later. This preparation may, in particular, take the form of a complementing for a subsequent subtraction (K). Here, such preparation is possible without loss of time and allows the arithmetic network to be made simpler than if the desired result of the logical combination had always to be produced in a single run through.

Simultaneously with the next main-store half cycle WO ("WRITING OF THE OPERAND"), the instruction counter, which takes over the sequence control, is advanced by one unit. In the computer according to the present invention, the instruction counter is not fashioned as a counting register, instead, the contents of the instruction counter are stored in a separate store cell of the high-speed store. This particular store cell is now read out into the high-speed store register 9 in a step RC ("READING CELL"), and simultaneously a "one" is written in the least significant, i.e., the lowest order, binary place or digit in the computing register 14, so that a subsequent addition operation (COUNTING) increases the contents of the instruction counter. Before or after the increase, the twelve-wire line 17 is again connected through so that the contents of the instruction counter also reach the main-store address register 5. Following this operation, the new contents of the instruction counter are again written into the mentioned particular high-speed store cell in a step WC ("WRITING CELL").

Only after these extensive preparations have been completed can the actual operation be carried out because now the operand has passed from the main store into the main store register 10 and from there is transferred immediately over a 24-wire line 18 to the computing register 14. A high-speed-store cycle is now set in operation during which the second operand, already prepared, enters the high-speed-store register 9 (RO) and the actual calculation ("CALCULATION") is carried out. Finally, the result from the high-speed-store register 9 is again written into the high-speed store location $k$.

During this actual calculating operation, the next instruction is already transferred from the main store to the main-store register 10 so that the main-store cycles and the high-speed-store cycles, in conjunction with any of the various logical combinations (raising the contents of the instruction counter, preparation of the operands, calculation of the result, modification of the main store address), follow one another without any time gap, as can be seen from the diagram in FIGURE 2a, in which the first line represents the sequence of events in the main store and the second line that in the high-speed store. A similar instruction may follow the first immediately. Similar time diagrams may also be drawn for the other elements in the computer, that is to say, for the computing register and the arithmetic network. These diagrams, too, would show the high degree of utilization of all members.

Only the two additional buffer registers 15 and 16 are necessary for the temporary storage of parts of an instruction which would otherwise be lost during the multiple use of the instruction register or main store register 10.

The address buffer register 15 is provided for the address $k$ of the second operand present in the high-speed store, and the buffer register 16 for the function part of the instruction. However, each of the two registers comprises only four binary places.

Apart from the instructions described, upon which the result enters the high-speed store, there are, generally, also those instructions by which the result enters the main store. Practically all pre-transfer operations can be avoided by suitably combining these types of instruction.

Those instructions which bring the result of a calculation or a logical combination into the main store require a minor alteration in the course of operation as shown in the diagram of FIGURE 2b. There is no change as far as half way through the second main store cycle. Only then must the actual calculation be carried out before there can start, in the main store, the second half cycle WR ("WRITING THE RESULT") which wires the result of the calculation in the store location N of the main store. During this second half cycle WR, the contents of the instruction counter is raised, as described above, at the end of which the address of the new instruction is present in the main-store address register 5 so that there can now follow a fresh store cycle RI having the significance "READ THE NEXT INSTRUCTION." The high-speed-store cycle which takes place in the interval between the two main-store half cycles (RO and WR), is so changed with respect to the actual calculating cycle described above that it is not the result of the calculation which is written into the store location $k$, but the operand which is unaltered or has only been prepared. This is achieved by letting the re-writing (WO) take place before the calculation (Ca).

The above-mentioned bit $m$ of the instruction register identifies instructions in which the modification of the contents of the store location $i$ by the modification factor $\pm p$ is utilized to form program loops. Such instructions have a course of operations as shown in the diagram of FIGURE 2c, which differs from the first diagram only in that the modification M is carried out before the re-writing takes place, so that the modified address is transferred back to the high-speed store. Thus, a simple way is provided in which to form a program loop which is suitable for the economical programming of subroutines, that is to say, frequently occurring subsidiary programs.

The efficiency of the computer described according to the invention is greater in many respects, than that of known machines because the following principles have, to a large extent, been followed:

(1) The elimination of store-changing transfers which do not contribute to the result of logical combinations.

(2) The main-store cycles succeed each other largely without any intervals, thereby to obtain the optimum utilization of the calculating speed limited by the slower main store.

(3) Multiple use of the computing elements which are not used to full capacity during the main-store cycles permits the elimination of a special address arithmetic unit.

(4) Indirect addressing simplifies the programming without lengthening the course of the calculation.

The computer according to the invention which has been described by way of example, in conjunction with FIGURE 1, is not limited to the execution of instructions of the type explained with reference to FIGURES 2*a*, 2*b* and 2*c*, as these types of operation are intended to represent only the usual case and may be used for the 15 instructions which occur most frequently. One combination of the instruction code, the sixteenth, is provided jointly for all further instructions. When this instruction is present, the modification factor is interpreted as a supplement to the instruction code and the address *i* is an operand address. Such instructions can thus be applied only to two locations in the high-speed store so that a preliminary instruction for writing in the high-speed store locations is sometimes necessary. Since these instructions do not occur very often, however, this preliminary instruction is accepted in return for an extremely small function part (only four bits) in the instruction register.

It will be understood that the above description of the present invention is susceptible to various modifications, changes and adaptations, and the same are intended to be comprehended within the meaning and range of equivalents of the appended claims. In particular, the references regarding word length, address length and store size are not to be regarded as limiting, nor do the principles of the parallel mode of representing numbers and of binary notations represent essential features of the invention. It will be appreciated that the invention may also be combined with other storage techniques and the ratio of the cycle speeds of the two stores is also variable within the scope of the invention, so long as the basic concept is retained, i.e., to utilize the different speeds for the benefit of instruction preparation operations and so on. Finally, the invention is not restricted to two-address machines, but may also be used with single-address or multiple-address systems.

What is claimed is:

1. An information storage and transfer system for an electronic digital computer, comprising, in combination:

(a) a high speed storage unit for storing a plurality of digital words at a corresponding plurality of storage locations therein, each of said storage locations being identified by a corresponding digital address;

(b) means for writing into said high speed storage unit a plurality of operand words upon which operations are to be performed;

(c) a first register coupled to said high speed storage unit for receiving digital words read out of said high speed storage unit;

(d) a lower speed storage unit for storing a plurality of digital words in a corresponding plurality of storage locations therein, each of said storage locations being identified by a corresponding digital address;

(e) means for writing into said lower speed storage unit a plurality of operand words upon which operations are to be performed and a plurality of instruction words each containing an operation portion signifying an operation to be performed, a high speed address portion signifying the address of an operand word stored in said high speed storage unit, and an address modification portion signifying in part the address of an operand word stored in said lower speed storage unit, said address modification portion including an algebraic sign;

(f) a second register coupled to said lower speed storage unit for receiving digital words read out of said lower speed storage unit;

(g) means for writing into said high speed storage unit a plurality of partial address words which, when combined with the address modification portion of a corresponding instruction word, will signify the complete address of an operand word in said lower speed storage unit; and (h) means for transferring the words stored in said high speed and lower speed storage units into said first and second registers in two alternating cycles, the first of said two cycles comprising an instruction transfer cycle in which an instruction word is transferred from said lower speed storage unit into said second register and a corresponding partial address word is transferred from said high speed storage unit into said first register, said partial address word being combined with the address modification portion of said instruction word to form the complete address of an operand word in said lower speed storage unit, and the second of said two cycles comprising an operation transfer cycle in which the operand words whose addresses were designated in the instruction transfer cycle are transferred from said high speed and lower speed storage units into the corresponding registers to be operated on in accordance with the operation designated in said instruction transfer cycle.

2. An information storage and transfer system as defined in claim 1 wherein said second register comprises at least three parts, the first part being coupled to said lower speed storage unit to receive the operation portion of said instruction word, the second part being coupled to said lower speed storage unit to receive the high speed address portion of said instruction word, and the third part being coupled to said lower speed storage unit to receive the address modification portion of said instruction word.

3. An information storage and transfer system as defined in claim 2 and further comprising an arithmetic network coupled between said first and second registers for combining the partial address word in said first register with the address modification portion of the instruction word in said second register during said instruction transfer cycle and for performing arithmetic operations on the two operand words contained in said first and second registers during said operation transfer cycle.

4. An information storage and transfer system as defined in claim 3 wherein said instruction word includes an additional portion consisting of only one binary bit for indicating whether or not the combined partial address word and the address modification portion of the instruction word should be entered into the high speed storage unit for storage therein, and further comprising a fourth part in said second register coupled to said lower speed storage unit for receiving said additional portion of said instruction word, and means coupled to said fourth part of said second register for executing the storage operation indicated thereby.

5. An information storage and transfer system as defined in claim 4 wherein said instruction word includes an additional address portion signifying the address of an operand word stored in said high speed storage unit, and further comprising a fifth part in said second register coupled to said lower speed storage unit for receiving said additional address portion of said instruction word, and means coupling said fifth part of said second register to said high speed storage unit.

6. An information storage and transfer system as defined in claim 5 wherein the access time and the storage cycle time of said high speed storage unit are equal to approximately one fourth of the access time and storage cycle time of the lower speed storage unit, and wherein this difference in speed is substantially compensated for by the address modification operation which only relates to the high speed storage unit.

7. An information storage and transfer system as defined in claim 6 in which a predetermined storage location of said high speed storage unit contains the address number of the instruction word which is to be read out next from the lower speed storage unit, and wherein the difference of speed between the storage cycle time of the high speed storage unit and the storage cycle time of the lower speed storage unit is selected so that the time required in the high speed storage unit to add one digit to said instruction word address number stored therein, to combine the partial address therein with said address modification portion of an instruction word, and to perform the operation indicated by an instruction word is approximately equal to one storage cycle of said lower speed storage unit.

References Cited

UNITED STATES PATENTS

| | | | |
|---|---|---|---|
| 3,059,222 | 10/1962 | Demmer | 340—172.5 |
| 3,275,991 | 9/1966 | Schneberger | 340—172.5 |

ROBERT C. BAILEY, *Primary Examiner.*

R. RICKERT, *Assistant Examiner.*